US012760392B2

(12) United States Patent
Yu et al.

(10) Patent No.: US 12,760,392 B2
(45) Date of Patent: Oct. 13, 2026

(54) METHOD FOR RECOVERING NICKEL FROM IRON-ALUMINUM SLAG OBTAINED BY BATTERY POWDER LEACHING

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Yingsheng Zhong, Foshan (CN); Aixia Li, Foshan (CN); Yinghao Xie, Foshan (CN); Xuemei Zhang, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 468 days.

(21) Appl. No.: 18/555,257

(22) PCT Filed: May 12, 2022

(86) PCT No.: PCT/CN2022/092486
§ 371 (c)(1),
(2) Date: Oct. 13, 2023

(87) PCT Pub. No.: WO2023/029570
PCT Pub. Date: Mar. 9, 2023

(65) Prior Publication Data

US 2024/0124953 A1 Apr. 18, 2024

(30) Foreign Application Priority Data

Aug. 31, 2021 (CN) ......................... 202111013492.4

(51) Int. Cl.
*C22B 3/00* (2006.01)
*C01F 7/441* (2022.01)
(Continued)

(52) U.S. Cl.
CPC ............ *C22B 23/043* (2013.01); *C01F 7/441* (2013.01); *C01G 49/02* (2013.01); *C01G 53/05* (2025.01);
(Continued)

(58) Field of Classification Search
None
See application file for complete search history.

(56) References Cited

U.S. PATENT DOCUMENTS 10,807,879 B2 10/2020 Ito et al.

FOREIGN PATENT DOCUMENTS

CN 102616867 A 8/2012
CN 103031441 A 4/2013
(Continued)

OTHER PUBLICATIONS

The Hungarian Search Report issued on Dec. 1, 2023 for HU P2300324.

(Continued)

*Primary Examiner* — Anthony M Liang
(74) *Attorney, Agent, or Firm* — Westbridge IP LLC

(57) ABSTRACT

Disclosed in the present invention is a method for recovering nickel from iron-aluminum slag obtained by battery powder leaching. The method comprises the following steps: adding a sulfuric acid solution into an iron-aluminum slag to dissolve, so as to obtain a sulfate solution; then adding an
(Continued)

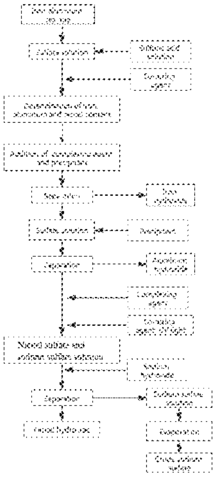

oxidizing agent; adding ammonia water and carbonate into the oxidized sulfate solution; adjusting the pH to 1.0-3.2 for reaction; separating ferric hydroxide to precipitate to obtain an iron-removed solution; adding carbonate into the iron-removed solution, adjusting the pH to 3.2-5.5 for reaction; separating aluminum hydroxide to precipitate to obtain an aluminum-removed solution; adding ammonia water to the aluminum-removed solution, adjusting the pH to 7.0-8.8 for reaction; washing and removing impurities to obtain a nickel complex; adding an oxidizing agent to the nickel complex to break the complex, so as to obtain a nickel-containing solution. By means of the present method, efficient separation of iron, aluminum and nickel in the iron-aluminum slag is efficiently achieved, the separation effect of iron, aluminum and nickel is improved, the loss of nickel is reduced, and the recovery rate of nickel is improved.

12 Claims, 1 Drawing Sheet

(51) Int. Cl.

| | |
|---|---|
| ***C01G 49/02*** | (2006.01) |
| ***C01G 53/04*** | (2025.01) |
| ***C01G 53/05*** | (2025.01) |
| ***C01G 53/10*** | (2006.01) |
| ***C22B 3/44*** | (2006.01) |
| ***C22B 7/00*** | (2006.01) |
| ***H01M 10/54*** | (2006.01) |

(52) U.S. Cl.

CPC ................ *C01G 53/10* (2013.01); *C22B 3/44* (2013.01); *C22B 7/007* (2013.01); *C22B 7/008* (2013.01); *C22B 23/0446* (2013.01); *C22B 23/0461* (2013.01); *H01M 10/54* (2013.01); *C01P 2006/40* (2013.01)

(56) References Cited

FOREIGN PATENT DOCUMENTS

| | | | | | |
|---|---|---|---|---|---|
| CN | 103288145 A | | 9/2013 | | |
| CN | 105506290 A | | 4/2016 | | |
| CN | 110492193 A | | 11/2019 | | |
| CN | 111004918 A | * | 4/2020 | ......... | C22B 23/0461 |
| CN | 111041214 A | | 4/2020 | | |
| CN | 111261967 A | | 6/2020 | | |
| CN | 111519031 A1 | | 8/2020 | | |
| CN | 113789447 A | | 12/2021 | | |
| EP | 3071717 B1 | | 12/2017 | | |
| HU | 2000129 A1 | | 12/2020 | | |
| JP | 2017036478 A | | 2/2017 | | |
| WO | 2020245736 A1 | | 12/2020 | | |

OTHER PUBLICATIONS

International Search Report for PCT/CN2022/092486 mailed Aug. 10, 2022, ISA/CN.

The Spanish Search Report issued on Oct. 2, 2024 for P202390131.

M.A. Rabah et al. Recovery of nickel, cobalt and some salts from spent Ni—MH batteries. Waste Management 28 (2008) 1159-1167, Aug. 21, 2007, vol. 28, pp. 1159-1167, <DOI: 10.1016/j.wasman.2007.06.007>.See section 2; figure 1.

* cited by examiner

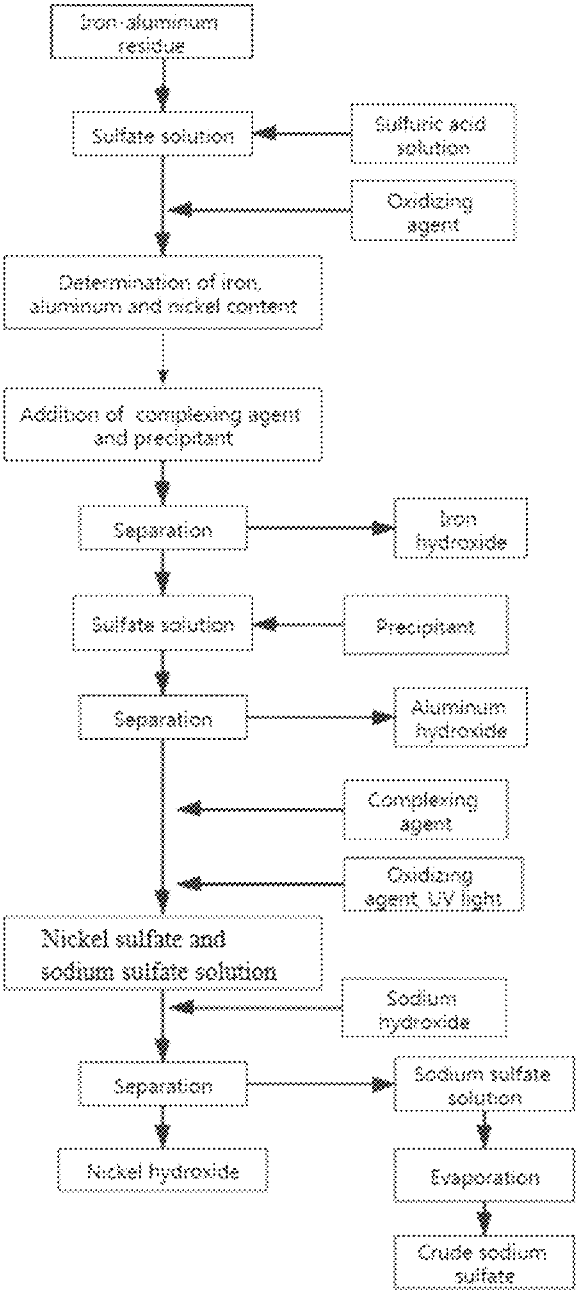
Iron-aluminum residue
Sulfate solution
Sulfuric acid solution
Oxidizing agent
Determination of iron, aluminum and nickel content
Addition of complexing agent and precipitant
Separation
Iron hydroxide
Sulfate solution
Precipitant
Separation
Aluminum hydroxide
Complexing agent
Oxidizing agent, UV light
Nickel sulfate and sodium sulfate solution
Sodium hydroxide
Separation
Sodium sulfate solution
Nickel hydroxide
Evaporation
Crude sodium sulfate

METHOD FOR RECOVERING NICKEL FROM IRON-ALUMINUM SLAG OBTAINED BY BATTERY POWDER LEACHING

The present application is the national phase of International Application No. PCT/CN2022/092486, titled "METHOD FOR RECOVERING NICKEL FROM IRON-ALUMINUM SLAG OBTAINED BY BATTERY POWDER LEACHING", which claims the priority to Chinese Patent Application No. 202111013492.4, titled "METHOD FOR RECOVERING NICKEL FROM IRON-ALUMINUM SLAG OBTAINED BY BATTERY POWDER LEACHING", filed on Aug. 31, 2021 with the Chinese National Intellectual Property Administration, the entire disclosures thereof are incorporated herein by reference.

FIELD

The invention belongs to the technical field of waste battery resource recovery, specifically to a method for recovering nickel in iron-aluminum residue obtained by leaching battery powder.

BACKGROUND

At this stage, the mainstream recycling technology for waste power batteries is a combination of fire-wet method. The technical steps comprise: (1) dismantling and discharging waste power batteries; (2) dry pyrolysis; (3) crushing and screening; (4) performing leaching on electrode powder with acid; (5) removing copper, iron and aluminum; (6) multi-step extraction and separation; (7) adding alkali for aging; (8) synthesizing cathode material. The above steps (1)-(8) are used to recycling products such as nickel, cobalt, manganese, and lithium from waste power batteries, as well as by-products such as aluminum, copper, iron, and graphite.

Metallic nickel is the key element of the cathode material in lithium batteries, especially in power batteries. The higher the nickel content, the better the cycle discharge stability and the higher the energy density. Therefore, the development of high-nickel power batteries is the mainstream of current power battery development, such as 622 type power battery ($LiNi_{0.6}Co_{0.2}Mn_{0.2}O_2$), 811 type power battery ($LiNi_{0.8}Co_{0.1}Mn_{0.1}O_2$).

In the existing recovery steps, a considerable proportion of nickel remains in the iron-aluminum residue obtained after removing copper and iron and aluminum, which causes the loss of metallic nickel and reduces the recovery rate of nickel.

SUMMARY

The present invention aims to solve at least one of the technical problems existing in the above-mentioned prior art. For this reason, the present invention proposes a method for recovering nickel from iron-aluminum residue obtained by leaching battery powder.

According to one aspect of the present invention, a method for recovering nickel from iron-aluminum residue obtained by leaching battery powder is proposed, which comprises the following steps:

S1: adding sulfuric acid solution to the iron-aluminum residue for dissolving the same to obtain a sulfate solution, then adding an oxidizing agent;

S2: adding ammonia water and carbonate to oxidized sulfate solution, adjusting pH to 1.0-3.2 for reaction, and separating iron hydroxide precipitate to obtain iron-removed liquid;

S3: adding carbonate to the iron-removed liquid, adjusting pH to 3.2-5.5 for reaction, and separating aluminum hydroxide precipitate to obtain aluminum-removed liquid;

S4: adding ammonia water to the aluminum-removed liquid, adjusting pH to 7.0-8.8 for reaction, and obtaining nickel complex after washing and removing impurities;

S5: adding an oxidizing agent to the nickel complex to break complexation to obtain nickel-containing solution. The nickel-containing solution comprises nickel sulfate and sodium sulfate.

In some embodiments of the present invention, in step S1, the oxidizing agent is hydrogen peroxide; preferably, the volume ratio of the sulfate solution to the hydrogen peroxide is 1:(0.01-0.5), and the mass fraction of the hydrogen peroxide is 1-35%.

In some embodiments of the present invention, in step S1, the concentration of the sulfuric acid solution is 0.01-8 mol/L, and the solid-liquid ratio of the iron-aluminum residue to the sulfuric acid solution is 1:(6-15) kg/L.

In some embodiments of the present invention, in step S2, molar ratio of $Fe^{3+}$ and $CO_3^{2-}$in reaction system is 1:(1-8), more preferably 1:(1-3).

In some embodiments of the present invention, in step S2, ratio of molar amount of nickel element to $NH_3$ in reaction system is 1:(1-10).

In some embodiments of the present invention, in step S3, molar ratio of $Al^{3+}$ and $CO_3^{2-}$ in reaction system is 10:(5-50), more preferably 10:(5-30).

In some preferred embodiments of the present invention, in step S3, pH is adjusted to 3.5-4.2.

In some preferred embodiments of the present invention, in step S4, pH is adjusted to 7.5-8.1.

In some embodiments of the present invention, in step S4, ratio of molar amount of nickel element to $NH_3$ in reaction system is 1:(4-20).

In some embodiments of the present invention, in step S2 and/or step S4, the concentration of ammonia water is 0.1-5 mol/L.

In some embodiments of the present invention, in step S2 and/or step S3, the carbonate is one or more of ammonium carbonate, sodium carbonate or sodium bicarbonate; preferably, the concentration of the carbonate is 0.01-5 mol/L.

In some embodiments of the present invention, in step S5, the oxidizing agent is one or two of hydrogen peroxide or sodium hypochlorite.

In some embodiments of the present invention, in step S5, the nickel complex is further subjected to ultraviolet light treatment when the complexation is broken. Ultraviolet light is used to enhance oxidation and break complexation, promote the production of more —OH free radicals to strengthen the degradation ability of the oxidizing agent, accelerate the formation of nickel sulfate, and will not entrain impurities again.

In some embodiments of the present invention, step S5 further comprises: adding sodium hydroxide to the nickel-containing solution to adjust the pH to 7.0-8.0, performing solid-liquid separation to obtain nickel hydroxide precipitate and sodium sulfate solution, evaporating sodium sulfate solution to obtain crude sodium sulfate. Preferably, sodium hydroxide is added to adjust the pH to 7.0-7.5.

According to a preferred embodiment of the present invention, it has at least the following beneficial effects:

1. The present invention improves the separation effect of iron, aluminum and nickel and increases the recovery rate of nickel through the synergistic use of complexing agent and precipitant. The inventor found that although direct addition of ammonia and/or other alkali to the sulfate solution obtained from the dissolution of iron and aluminum residue can separate iron, aluminum and nickel in the form of hydroxide precipitate, but considering that the hydrolysis of iron and aluminum produces iron and aluminum hydroxide colloid, which would adsorb a large amount of nickel ions and the colloid will not be separated from the solution obviously, it would lead to high nickel content in the recovered iron and aluminum colloid, low nickel recovery, and poor separation effect between iron and aluminum hydroxide colloid and the upper layer solution. Therefore, the inventors make use of the ability of ammonia molecule ($NH_3$) to complex nickel which is stronger than the ability of $CO_3^{2-}$/OH to precipitate, which promotes the formation of complexes ($Ni(NH_3)_2SO_4$, $Ni(NH_3)_3SO_4$, $Ni(NH_3)_4SO_4$, $Ni(NH_3)_5SO_4$, etc.) from nickel after the addition of ammonia water in step S2 iron precipitation stage, and then addition of carbonate to form iron carbonate, at this time, the nickel carbonate/nickel hydroxide has not reach the precipitation pH, so co-precipitation will not occur. During the reaction, most of the iron carbonate produced is hydrolyzed into ferric hydroxide colloid, and a small part of the iron carbonate would sink on the ferric hydroxide colloid, changing the properties of the ferric hydroxide colloid and improving the stratification effect of the ferric hydroxide colloid. The subsequent addition of carbonate promotes the formation of hydrolysis product aluminum hydroxide precipitate. Similarly, a small part of the aluminum carbonate will precipitate on the aluminum hydroxide colloid, which improves the stratification effect of the aluminum hydroxide colloid. The produced ferric hydroxide and aluminum hydroxide colloids are both clearly stratified, which is easy to separate. The method well realizes the high-efficiency separation of iron, aluminum, and nickel in the iron-aluminum residue, improves the separation effect of iron, aluminum, and nickel, reduces the loss of nickel, and improves the nickel recovery rate.

2. In the sulfate solution obtained by dissolving iron-aluminum residue, the pH (5.5-8.0) of ferrous precipitation by hydrolysis of divalent iron coincides with the pH (7.0-8.0) required for the formation of nickel complexes. Therefore, it is better to oxidize iron to ferric iron as far as possible, since a high valent ferric has a lower pH (pH<3.2) for precipitation, which can promote the separation of iron, aluminum, and nickel more thoroughly, and better achieve the purpose of recovery of iron, aluminum and nickel. After removing aluminum, the solution contains some other impurities, therefore it is better to generate nickel complexes ($Ni(NH_3)_2SO_4$, $Ni(NH_3)_3SO_4$, $Ni(NH_3)_4SO_4$, $Ni(NH_3)_5SO_4$, etc.). The separated nickel complexes are added with oxidizing agent to destroy complexation without entraining impurities, and finally high purity nickel sulfate can be obtained.

BRIEF DESCRIPTION OF DRAWINGS

The present invention will be further described below in conjunction with the accompanying drawings and embodiments, in which:

FIG. 1 is a process flow diagram of the present invention.

DETAILED DESCRIPTION

Hereinafter, the concept and technical effects of the invention will be clearly and completely described below in combination with embodiments, so that the purpose, characteristics and effects of the invention can be fully understood. Obviously, the described examples are only part of the examples of the invention, not all of the examples. Based on the embodiments of the invention, other examples obtained by those skilled in the art without creative work belong to the protection scope of the invention.

Example 1

A method for recovering nickel in iron-aluminum residue obtained by leaching battery powder, referring to FIG. 1, the specific process was:

(1) Iron-aluminum residue pretreatment: 200 g of iron-aluminum residue was dissolved in 1400 ml of sulfuric acid with a concentration of 0.46 mol/L to obtain sulfate solution, and then 70 ml of 30 wt % hydrogen peroxide was added.

(2) Sulfate solution: the moles of iron, aluminum, and nickel in the sulfate solution were determined to be 0.233 mol, 0.165 mol, 0.094 mol respectively. 320 ml of 0.55 mol/L ammonia water was added as a complexing agent in advance to the sulfate solution, and then 355 ml of 1.50 mol/L sodium carbonate was added as a precipitant, stirred. The pH was adjusted to 2.8, and iron hydroxide precipitate was generated and separated. 130 ml of sodium carbonate was further added to the sulfate solution, and stirred. The pH was adjusted to 3.5, and aluminum hydroxide precipitate was generated and separated. 685 ml of ammonia water was added to the sulfate solution, and stirred. The pH was adjusted to 7.6, and nickel-containing complex solution was generated. The nickel-containing complex solution was washed with water, centrifuged and was allowed to stand, supernatant liquid was removed and nickel complex was separated.

(3) Separation of nickel from nickel complex: 45 ml of 30 wt % hydrogen peroxide was added to the nickel complex. 400 w ultraviolet light was applied to the top of the solution for 15 min. Nickel sulfate solution was obtained, and stirred. 1.0 mol/L sodium hydroxide was added to adjust pH to 7.4, and nickel hydroxide precipitate was obtained. Solid-liquid separation was performed to obtain nickel hydroxide and sodium sulfate solution. The sodium sulfate solution was evaporated at 110° C. to obtain crude sodium sulfate.

Example 2

A method for recovering nickel in iron-aluminum residue obtained by leaching battery powder, the specific process was:

(1) Iron-aluminum residue pretreatment: 200 g of iron-aluminum residue was dissolved in 1500 ml of sulfuric acid with a concentration of 0.74 mol/L to obtain sulfate solution, and then 70 ml of 30 wt % hydrogen peroxide was added.

(2) Sulfate solution: the moles of iron, aluminum, and nickel in the sulfate solution were determined to be 0.233 mol, 0.165 mol, 0.094 mol respectively. 340 ml of 0.55 mol/L ammonia water was added as a complexing agent in advance to the sulfate solution, and then 360 ml of 1.50 mol/L sodium carbonate was added as a precipitant, stirred. The pH was adjusted to 2.9, and iron hydroxide precipitate was generated and separated. 115 ml of sodium carbonate was further added to the sulfate solution, and stirred. The pH was adjusted to 3.4, and aluminum hydroxide precipitate was generated and separated. 725 ml of ammonia water was added to the sulfate solution, and stirred. The pH was adjusted to 7.6, and nickel-containing complex solution was generated. The nickel-containing complex solution was washed with water, centrifuged and was allowed to stand, supernatant liquid was removed and nickel complex was separated.

(3) Separation of nickel from nickel complex: 50 ml of 30 wt % hydrogen peroxide was added to the nickel complex. 400 w ultraviolet light was applied to the top of the solution for 15 min. Nickel sulfate solution was obtained, and stirred. 1.0 mol/L sodium hydroxide was added to adjust pH to 7.4, and nickel hydroxide precipitate was obtained. Solid-liquid separation was performed to obtain nickel hydroxide and sodium sulfate solution. The sodium sulfate solution was evaporated at 110° C. to obtain crude sodium sulfate.

Example 3

A method for recovering nickel in iron-aluminum residue obtained by leaching battery powder, the specific process was:

(1) Iron-aluminum residue pretreatment: 200 g of iron-aluminum residue was dissolved in 1100 ml of sulfuric acid with a concentration of 0.87 mol/L to obtain sulfate solution, and then 70 ml of 30 wt % hydrogen peroxide was added.

(2) Sulfate solution: the moles of iron, aluminum, and nickel in the sulfate solution were determined to be 0.237 mol, 0.166 mol, 0.092 mol respectively. 330 ml of 0.55 mol/L ammonia water was added as a complexing agent in advance to the sulfate solution, and then 370 ml of 1.50 mol/L sodium carbonate was added as a precipitant, stirred. The pH was adjusted to 2.8, and iron hydroxide precipitate was generated and separated. 130 ml of sodium carbonate was further added to the sulfate solution, and stirred. The pH was adjusted to 3.5, and aluminum hydroxide precipitate was generated and separated. 685 ml of ammonia water was added to the sulfate solution, and stirred. The pH was adjusted to 7.6, and nickel-containing complex solution was generated. The nickel-containing complex solution was washed with water, centrifuged and was allowed to stand, supernatant liquid was removed and nickel complex was separated.

(3) Separation of nickel from nickel complex: 40 ml of 30 wt % hydrogen peroxide was added to the nickel complex. 400 w ultraviolet light was applied to the top of the solution for 15 min. Nickel sulfate solution was obtained, and stirred. 1.0 mol/L sodium hydroxide was added to adjust pH to 7.4, and nickel hydroxide precipitate was obtained. Solid-liquid separation was performed to obtain nickel hydroxide and sodium sulfate solution. The sodium sulfate solution was evaporated at 110° C. to obtain crude sodium sulfate.

Example 4

A method for recovering nickel in iron-aluminum residue obtained by leaching battery powder, the specific process was:

(1) Iron-aluminum residue pretreatment: 200 g of iron-aluminum residue was dissolved in 2000 ml of sulfuric acid with a concentration of 0.24 mol/L to obtain sulfate solution, and then 75 ml of 30 wt % hydrogen peroxide was added.

(2) Sulfate solution: the moles of iron, aluminum, and nickel in the sulfate solution were determined to be 0.233 mol, 0.163 mol, 0.094 mol respectively. 330 ml of 0.55 mol/L ammonia water was added as a complexing agent in advance to the sulfate solution, and then 355 ml of 1.50 mol/L sodium carbonate was added as a precipitant, stirred. The pH was adjusted to 2.8, and iron hydroxide precipitate was generated and separated. 130 ml of sodium carbonate was further added to the sulfate solution, and stirred. The pH was adjusted to 3.5, and aluminum hydroxide precipitate was generated and separated. 710 ml of ammonia water was added to the sulfate solution, and stirred. The pH was adjusted to 7.6, and nickel-containing complex solution was generated. The nickel-containing complex solution was washed with water, centrifuged and was allowed to stand, supernatant liquid was removed and nickel complex was separated.

(3) Separation of nickel from nickel complex: 60 ml of 30 wt % hydrogen peroxide was added to the nickel complex. 400 w ultraviolet light was applied to the top of the solution for 12 min. Nickel sulfate solution was obtained, and stirred. 1.0 mol/L sodium hydroxide was added to adjust pH to 7.4, and nickel hydroxide precipitate was obtained. Solid-liquid separation was performed to obtain nickel hydroxide and sodium sulfate solution. The sodium sulfate solution was evaporated at 110° C. to obtain crude sodium sulfate.

Example 5

A method for recovering nickel in iron-aluminum residue obtained by leaching battery powder, the specific process was:

(1) Iron-aluminum residue pretreatment: 200 g of iron-aluminum residue was dissolved in 2200 ml of sulfuric acid with a concentration of 0.35 mol/L to obtain sulfate solution, and then 80 ml of 30 wt % hydrogen peroxide was added.

(2) Sulfate solution: the moles of iron, aluminum, and nickel in the sulfate solution were determined to be 0.234 mol, 0.165 mol, 0.094 mol respectively. 320 ml of 0.55 mol/L ammonia water was added as a complexing agent in advance to the sulfate solution, and then 355 ml of 1.50 mol/L sodium carbonate was added as a precipitant, stirred. The pH was adjusted to 2.8, and iron hydroxide precipitate was generated and separated. 130 ml of sodium carbonate was further added to the sulfate solution, and stirred. The pH was adjusted to 3.5, and aluminum hydroxide precipitate was generated and separated. 690 ml of ammonia water was added to the sulfate solution, and stirred. The pH was adjusted to 7.6, and nickel-containing complex solution was generated. The nickel-containing complex solution was washed with water, centrifuged and was allowed to stand, supernatant liquid was removed and nickel complex was separated.

(3) Separation of nickel from nickel complex: 50 ml of 30 wt % hydrogen peroxide was added to the nickel complex. 400 w ultraviolet light was applied to the top of the solution for 15 min. Nickel sulfate solution was obtained, and stirred. 1.0 mol/L sodium hydroxide was added to adjust pH to 7.4, and nickel hydroxide precipitate was obtained. Solid-liquid separation was performed to obtain nickel hydroxide and sodium sulfate solution. The sodium sulfate solution was evaporated at 110° C. to obtain crude sodium sulfate.

Comparative Example 1

A method for recovering nickel in the iron-aluminum residue obtained by leaching battery powder, which differs from the Examples in that sodium carbonate was not added. The specific process was:

(1) Iron-aluminum residue pretreatment: 200 g of iron-aluminum residue was dissolved in 1400 ml of sulfuric acid with a concentration of 0.64 mol/L to obtain sulfate solution, and then 70 ml of 30 wt % hydrogen peroxide was added.

(2) Sulfate solution: the moles of iron, aluminum, and nickel in the sulfate solution were determined to be 0.233 mol, 0.165 mol, 0.094 mol. 320 ml of 0.55 mol/L ammonia water was added to the sulfate solution, and stirred. The pH was adjusted to 2.8, and iron hydroxide precipitate was generated, separated, and stirred. 195 ml of ammonia water was further added to the sulfate solution to adjust pH to 3.8, and aluminum hydroxide precipitate was generated, separated, and stirred. 675 ml of ammonia water was added to the sulfate solution. The pH was adjusted to 7.6, and nickel-containing complex solution was generated. The nickel-containing complex solution was washed with water, centrifuged, and allowed to stand, supernatant liquid was removed and nickel complex was separated.

(3) Separation of nickel from nickel complex: 45 ml of 30 wt % hydrogen peroxide was added to the nickel complex. 400 w ultraviolet light was applied to the top of the solution for 15 min, nickel sulfate solution was obtained, and stirred. 1.0 mol/L sodium hydroxide was added to adjust pH to 7.7, and nickel hydroxide precipitate was obtained. Solid-liquid separation was performed to obtain nickel hydroxide and sodium sulfate solution. The sodium sulfate solution was evaporated at 110° C. to obtain crude sodium sulfate.

Comparative Example 2

A method for recovering nickel in the iron-aluminum residue obtained by leaching battery powder, which differs from the Examples in that sodium carbonate was not added. The specific process was:

(1) Iron-aluminum residue pretreatment: 200 g of iron-aluminum residue was dissolved in 1600 ml of sulfuric acid with a concentration of 0.55 mol/L to obtain sulfate solution, and then 80 ml of 30 wt % hydrogen peroxide was added.

(2) Sulfate solution: the moles of iron, aluminum, and nickel in the sulfate solution were determined to be 0.234 mol, 0.164 mol, 0.094 mol. 750 ml of 0.50 mol/L sodium hydroxide was added to the sulfate solution, and stirred. The pH was adjusted to 2.5, and iron hydroxide precipitate was generated, separated, and stirred. 130 ml of sodium hydroxide was further added to the sulfate solution to adjust pH to 3.7, and aluminum hydroxide precipitate was generated, separated, and stirred. 195 ml of sodium hydroxide was added to the sulfate solution. The pH was adjusted to 7.8, and nickel hydroxide precipitate was generated.

Comparative Example 3

A method for recovering nickel in the iron-aluminum residue obtained by leaching battery powder, which differs from the Example 1 in that sodium carbonate was not added. The specific process was:

(1) Iron-aluminum residue pretreatment: 200 g of iron-aluminum residue was dissolved in 1400 ml of sulfuric acid with a concentration of 0.55 mol/L to obtain a sulfate solution.

(2) Sulfate solution: the moles of iron, aluminum, and nickel in the sulfate solution were determined to be 0.233 mol, 0.165 mol, 0.094 mol respectively. 320 ml of 0.55 mol/L ammonia water was added to the sulfate solution in advance, and then 355 ml of 1.50 mol/L sodium carbonate was added, and stirred. The pH was adjusted to 2.8, and iron hydroxide precipitate was generated and separated. 130 ml of sodium carbonate was further added to the sulfate solution, and stirred. The pH was adjusted to 3.5, and aluminum hydroxide precipitate was generated and separated. 685 ml of ammonia water was added to the sulfate solution, and stirred. The pH was adjusted to 7.6, and nickel-containing complex solution was generated. The nickel-containing complex solution was washed to remove impurities and a nickel complex was obtained.

(3) Separation of nickel from nickel complex: 45 ml of 30 wt % hydrogen peroxide was added to the nickel complex. 400 w ultraviolet light was applied to the top of the solution for 15 min, and nickel sulfate solution was obtained, and stirred. 1.0 mol/L sodium hydroxide was added to adjust pH to 7.4, and nickel hydroxide precipitate was obtained. Solid-liquid separation was performed to obtain nickel hydroxide and sodium sulfate solution. The sodium sulfate solution was evaporated at 110° C. to obtain crude sodium sulfate.

The iron hydroxide, aluminum hydroxide, and nickel sulfate obtained in Examples 1-5 and Comparative Examples 1-3 were all calcinated to constant weight at 160° C. (the iron hydroxide and aluminum hydroxide were dehydrated and decomposed into iron oxide, aluminum oxide, and nickel sulfate dehydrated crystal water respectively). The test data was shown in Table 1.

TABLE 1

Data of Examples 1-5 and Comparative Examples 1-2.

| | separated product | nickel (%) | iron (%) | aluminum (%) |
|---|---|---|---|---|
| Example 1 | iron oxide | 1.06 | 67.83 | 0.11 |
| | aluminum oxide | 0.63 | 0.76 | 51.36 |
| | nickel sulfate | 36.14 | 0.07 | <0.01 |
| Example 2 | iron oxide | 1.14 | 68.36 | 0.17 |
| | aluminum oxide | 0.89 | 0.71 | 51.36 |
| | nickel sulfate | 35.86 | 0.06 | <0.01 |
| Example 3 | iron oxide | 1.36 | 68.02 | 0.20 |
| | aluminum oxide | 0.75 | 0.50 | 51.36 |
| | nickel sulfate | 35.79 | 0.05 | <0.01 |
| Example 4 | iron oxide | 1.30 | 68.17 | 0.12 |
| | aluminum oxide | 0.41 | 0.76 | 51.36 |
| | nickel sulfate | 36.02 | 0.03 | <0.01 |
| Example 5 | iron oxide | 1.22 | 68.26 | 0.13 |
| | aluminum oxide | 0.57 | 0.98 | 51.36 |
| | nickel sulfate | 36.23 | 0.08 | <0.01 |
| Comparative Example 1 | iron oxide | 4.36 | 68.83 | 0.10 |
| | aluminum oxide | 7.33 | 3.66 | 51.36 |
| | nickel sulfate | 35.14 | 7.85 | <0.01 |
| Comparative Example 2 | iron oxide | 5.58 | 62.65 | 0.19 |
| | aluminum oxide | 7.98 | 3.46 | 51.36 |
| | nickel sulfate | 35.28 | 6.03 | <0.01 |

TABLE 1-continued

Data of Examples 1-5 and Comparative Examples 1-2.

| | separated product | nickel (%) | iron (%) | aluminum (%) |
|---|---|---|---|---|
| Comparative Example 3 | iron oxide | 4.36 | 62.40 | 0.33 |
| | aluminum oxide | 13.34 | 3.46 | 51.36 |
| | nickel sulfate | 35.43 | 5.86 | <0.01 |

It can be seen from Table 1 that, through measuring, all of the nickel contents in iron oxide and aluminum oxide obtained by dehydration in the Examples were less than 1.4%, the iron content in nickel sulfate was less than 0.10%, and the aluminum content in nickel sulfate was less than 0.01%. The data is better than the method of directly separating iron, aluminum and nickel by alkaline precipitation in Comparative Examples 1 and 2 (nickel content in iron oxide was more than 4.36%, the nickel content in aluminum oxide was more than 7.33%). It shows that the present invention has well realized high-efficiency separation of iron, aluminum, and nickel in iron-aluminum residue, improved the separation effect of iron, aluminum, and nickel, reduced the loss of nickel, and increased the recovery rate of nickel.

The preferred examples of the present disclosure have been described in detail above with reference to the accompanying drawings, but the present disclosure is not limited to the described examples. Within the scope of knowledge possessed by the ordinary skilled person in the art, various modifications can be made without departing from the purpose of the present invention. In addition, in the case of no conflict, the examples of the present invention and the features in the examples can be combined with each other.

The invention claimed is:

1. A method for recovering nickel from iron-aluminum residue obtained by leaching battery powder, comprising the following steps:

S1: adding sulfuric acid solution to the iron-aluminum residue for dissolving the same to obtain a sulfate solution, then adding an oxidizing agent;

S2: adding ammonia water and carbonate to oxidized sulfate solution, adjusting pH to 1.0-3.2 for reaction, and separating iron hydroxide precipitate to obtain iron-removed liquid;

S3: adding carbonate to the iron-removed liquid, adjusting pH to 3.2-5.5 for reaction, and separating aluminum hydroxide precipitate to obtain aluminum-removed liquid;

S4: adding ammonia water to the aluminum-removed liquid, adjusting pH to 7.0-8.8 for reaction, and obtaining nickel complex after washing and removing impurities;

S5: adding an oxidizing agent to the nickel complex to break complexation to obtain nickel-containing solution.

2. The method according to claim 1, wherein in step S1, the oxidizing agent is hydrogen peroxide.

3. The method according to claim 1, wherein in step S2, molar ratio of $Fe^{3+}$ and $CO_3^{2-}$ in reaction system is 1: (1-8).

4. The method according to claim 1, wherein in step S2, ratio of molar amount of nickel element to $NH_3$ in reaction system is 1:(1-10).

5. The method according to claim 1, wherein in step S3, molar ratio of $Al^{3+}$ and $CO_3^{2-}$ in reaction system is 10:(5-50).

6. The method according to claim 1, wherein in step S4, ratio of molar amount of nickel element to $NH_3$ in reaction system is 1:(4-20).

7. The method according to claim 1, wherein in step S2 and/or step S4, the concentration of the ammonia water is 0.1-5 mol/L.

8. The method according to claim 1, wherein in step S2 and/or step S3, the carbonate is one or more of ammonium carbonate, sodium carbonate or sodium bicarbonate.

9. The method according to claim 1, wherein in step S5, the oxidizing agent is one or two of hydrogen peroxide or sodium hypochlorite.

10. The method according to claim 1, wherein in step S5, the nickel complex is further subjected to ultraviolet light treatment when the complexation is broken.

11. The method according to claim 2, wherein in the volume ratio of the sulfate solution to the hydrogen peroxide is 1:(0.01-0.5), and the mass fraction of the hydrogen peroxide is 1-35%.

12. The method according to claim 8, wherein in the concentration of the carbonate is 0.01-5 mol/L.

* * * * *